United States Patent [19]
Oguchi et al.

[11] 3,754,993
[45] Aug. 28, 1973

[54] LIQUID-SOLID PARTICLE OR LIQUID-GAS-SOLID PARTICLE CONTACTING METHOD

[75] Inventors: Yutaka Oguchi, Tokyo; Junichi Kubo, Kawasaki, both of Japan

[73] Assignee: Nippon Oil Company, Ltd., Tokyo, Japan

[22] Filed: June 17, 1970

[21] Appl. No.: 46,862

[30] Foreign Application Priority Data
June 21, 1969 Japan .................. 44/48674

[52] U.S. Cl. ............... 134/25 R, 23/285, 23/288 E, 208/213, 210/20, 210/84, 423/659
[51] Int. Cl. .................. B08b 3/04, C10g 23/08
[58] Field of Search .................. 134/25 R; 23/285, 23/288 E, 1 R; 210/20, 84; 208/213

[56] References Cited
UNITED STATES PATENTS

| | | | |
|---|---|---|---|
| 1,380,067 | 5/1921 | Koch et al. | 23/288 E UX |
| 2,134,571 | 10/1938 | Morlock | 23/285 UX |
| 2,443,817 | 6/1948 | Draeger et al. | 23/288 E X |
| 2,577,856 | 12/1951 | Nelson | 23/285 |
| 2,613,181 | 10/1952 | Green et al. | 210/20 |
| 2,747,003 | 5/1956 | Kilpatrick | 23/288 E X |
| 3,081,289 | 3/1963 | Cheney et al. | 23/285 X |
| 3,124,518 | 3/1964 | Guzman et al. | 23/288 E X |
| 3,130,014 | 4/1964 | Stanton | 23/288 E |
| 3,198,729 | 8/1965 | Payne | 23/288 E X |
| 3,485,893 | 12/1969 | Mayhue | 23/288 E UX |

FOREIGN PATENTS OR APPLICATIONS

| | | | |
|---|---|---|---|
| 406,252 | 11/1920 | Germany | 23/285 |
| 620,043 | 3/1949 | Great Britain | 23/285 |

*Primary Examiner*—Barry S. Richman
*Attorney*—Sherman and Shalloway

[57] ABSTRACT

A novel liquid-particulate solid or liquid-gas-particulate solid contacting method which comprises causing a liquid and a particulate solid or a liquid, a gas and a particulate solid which have contacted each other in a contact zone while ascending through the contact zone in substantial motion to overflow into an overflow zone, allowing the particulate solid to freely drop through a precipitation zone in succession to the overflow zone and recycling the particulate solid to below the contact zone.

8 Claims, 6 Drawing Figures

LIQUID-SOLID PARTICLE OR LIQUID-GAS-SOLID PARTICLE CONTACTING METHOD

The present invention relates to a novel liquid-particulate solid or liquid-gas-particulate solid contacting method. More specifically, the invention relates to a novel liquid-particulate solid or liquid-gas-particulate solid contacting method which comprises causing a liquid and a particulate solid or a liquid, a gas and a particulate solid which have contacted each other in a contact zone while ascending through such zone in substantial motion to overflow into an overflow zone, allowing the particulate solid to freely drop through a precipitation zone in succession to the overflow zone and recycling the particulate solid to below the contact zone.

In the past, a number of methods have been proposed for contacting a liquid and a particulate solid or a liquid, a gas and a particulate solid with each other. Particularly where the particulate solid is a catalyst, many methods have been practiced industrially as methods of catalytic reaction. These conventional contacting methods are broadly classified, by the type of particulate solid bed, into a fixed-bed process, a moving bed process and fluidized bed process.

These contacting processes respectively have meritorious features but simultaneously possess various problems.

For instance, the fixed-bed process has the advantage that the operation is simple and the operational conditions can be changed relatively simply. However, on the other hand, the process has the disadvantages that the particle size of the solid used for the fixed bed is usually restricted to 2 mm or larger and that the replacement of the particulate solid which has become unserviceable or has completed a contacting operation, necessitates interruption of the operation. Furthermore, the process is not adapted for use in a catalytic treatment which involves absorption or generation of heat, because the temperature interior of the bed can hardly be maintained uniform.

The contacting method utilizing a moving bed has the advantage that the replacement of a catalyst can be achieved without interrupting the catalytic reaction but, on the other hand, has such disadvantage that the apparatus for and operation of moving the bed proper are complicated, in addition to the disadvantage of the aforesaid fixed-bed process relating to reaction, since the reaction in this process itself is essentially the same as that in the fixed-bed process. Thus, there are only a few cases wherein this process is successfully used industrially.

In addition to these processes, a different process has been used in which a particulate solid is used in a fuidized state. The fluidized beds used in this process are broadly classified into two types. One of them is the so-called dense-phase fluidized bed.

When a particulate solid is contained in a vessel and fluid (liquid and/or gas) is introduced into the vessel from the underside, preferably through a distributor, the bed of particulate solid is expanded from the initial packed state and the individual particles are in substantial motion and thus the entire particulate solid exhibits a condition just like a liquid. This is the basic condition of the fluidized bed. In the fluidized bed, it is usual that the quantity and velocity of fluid introduced into the bed from the underside are adjusted according to the specific gravity, the particle size and the quantity of the particles contained in the vessel, so as to ensure that a particle bed is maintained without letting the particles be discharged upwardly to the outside of the system as a result of being accelerated by the fluid to a velocity higher than the terminal velocity. In this case, therefore, an upper layer of the bed exists necessarily.

A typical example of this bed is the boiling bed used in the treatment of hydrocarbons as described, for example, in Japanese Pat. Publication No. 26105/68.

Since the particle bed exhibits behavior just like liquid as stated above, the dense-phase fluidized bed has the advantages that the substitution and replacement of the particles (catalyst) can be achieved relatively easily, that substances attached to or deposited on the surface of the catalyst particles are removed therefrom as a result of the catalyst particles contacting each other in their motion, and that the bed temperature can easily be maintained constant. Therefore, this bed is being used for industrial purposes.

However, the process utilizing this fluidized bed has the disadvantages that the normal state of operation, including the separation of particulate solid and fluid, is extremely difficult to maintain, that the operation controlling procedure is complicated and further that the operational flexibility is small.

In the aforesaid boiling bed, for example, the upper level of the catalyst bed is readily moved by a variation in the quantity of oil supplied to the reaction vessel, so that the operational condition undergoes a considerably severe restriction. In addition, since irregularities in particle size and density of the catalyst particles result in floating and dispersion of the particles at the upper level of the catalyst bed and accordingly separation of the particles from the reaction liquid, a considerably large settling and separation zone must be provided. This is because, in a fluidized bed, the particulate solid present in the system always undergoes a force of fluid from the underside thereof but, on the other hand, a counterforce must be imposed on the particles to hold them within the system.

Another type of the fluidized bed is a dilute-phase fluidized bed. In the use of this bed, a particulate solid is blown to the outside of the system by fluid which is introduced from the lower side of the system at a velocity higher than the terminal velocity of the particles and the particles thus blown are allowed to fly away without being collected or are collected by a cyclone or screen. The dilute-phase fluidized bed process includes a type of process wherein a particulate solid-fluid slurry is vigorously recycled by means of a flow of fluid.

The process of cracking hydrocarbon oils by F.C.C. (fluidized catalytic cracking) is a typical example of the former type of dilute-phase fluidized bed process. (Some of the F.C.C. processes fall within the category of the dense-phase fluidized bed process described above.) A typical example of the latter type of process which utilizes a circulating flow, is a process disclosed, for example, in German Pat. specification No. 843,842 wherein use is made of a double-walled reaction vessel and fluid is ejected through a nozzle to cause a vigorous circulation of flow.

These processes utilizing a dilute-phase fluidized bed are advantageous in that particulate solids of extremely small size can be used and therefore a large area of contact can be obtained per unit quantity of particles, in that the replacement of the exhausted particulate solid can be achieved without interrupting the operation and further in that the contacting temperature can be maintained relatively uniformly.

In this type of process, however, it is generally extremely difficult to separate the particulate solid and fluid, and in case, for example, of the process described in the aforesaid German Patent, a special separation zone is provided in the apparatus for practicing the process. In this type of process, it is also usually necessary to discharge the slurry to the outside of the system and separate the particulate solid and fluid by means of a cyclone or screen. Furthermore, in the dilute-phase fluidized bed process it is essentially difficult to increase the concentration of particulate solid in fluid and accordingly liquid-particulate solid or liquid-gas-particulate solid contact closer than a certain degree cannot be attained. Therefore, the process is not effectively used for a catalytic oxidation reaction, catalytic desulfurization reaction, etc. which utilize a unique catalytic activity on the surface of a particulate solid. Further, in the process it is necessary to introduce fluid at a considerably high velocity so as to attain a velocity higher than the terminal velocity of the particulate solid. Where a vigorous circulation of fluid is utilized as stated above, a slurry flows in the system at a high velocity, so that not only is it difficult to prevent errosion and errosion-corrosion of the component parts of the apparatus used, but also a mechanical problem is liable to occur, and in addition, the particulate solid tends to be subjected to wear and breakage due to its intense motion. Therefore, the particulate solid used must have great strength.

The present invention is concerned with a novel liquid-particulate solid or liquid-gas-particulate solid contacting method which obviates the above-described problems possessed by the conventional processes.

The object of the present invention is to provide a novel liquid-particulate solid or liquid-gas-particulate solid contacting method which can effectively be used for physical treatments such as absorption, drying, adsorption, desorption and cleaning, or for chemical treatments such as oxidation, reduction, cracking and hydration, particularly for isomerization, dehydrogenation, polymerization, reforming, alkylation, etc. of hydrocarbons or for hydrogenation treatments such as hydrocracking, hydrogenation and hydrodesulfurization.

According to the present invention, a method is provided of closely contacting a liquid and a particulate solid or a liquid, a gas and a particulate solid with each other which comprises:

a. accommodating in a contact zone a particulate solid having a specific gravity greater than that of a liquid to be contacted therewith, b. introducing the liquid or the liquid and a gas into said contact zone from the underside thereof, c. causing substantially all of the particulate solid to be in continuous motion and ascend in the contact zone, thereby substantially bringing the liquid and the particulate solid or the liquid, the gas and the particulate solid into contact with each other, and d. causing substantially all of the liquid and the particulate solid or substantially all of the liquid, the gas and the particulate solid, ascending through the contact zone, to overflow into an overflow zone provided upwardly of and having a larger cross-sectional area than that of the contact zone, e. the particulate solid overflowing into the overflow zone being allowed to drop under gravity through a precipitation zone which is provided exterior of the contact zone with its upper end communicating with the overflow zone and its lower end communicating with the lower end of the contact zone, f. in the lower portion of the precipitation zone, the particulate solid particle forming a thickly accumulated layer and moving downward in that state under gravity to be recycled into the lower portion of the contact zone, and g. the liquid or the liquid and gas overflowing into the overflow zone being substantially entirely withdrawn to the outside of the system from the overflow zone.

Namely, in the contacting method according to the present invention, use is made of the basic behavior of the fluidized particles in the contact zone, but the particles are always in a substantial ascending motion.

Therefore, in the contact zone the particulate solid moves upward in the state of being suspended in the liquid and the gas passes through the particulate solid and liquid upwardly in the form of bubbles where the gas is present in the system.

In the contact zone, the particulate solid has an upward velocity as a whole and the velocity of the fluid may be higher or lower than the terminal velocity of the particulate solid. Such motion of the solid particles is different from that of the particles in the so-called dense-phase fluidized bed which is defined from the chemical engineering viewpoint, and is clearly distinguishable from the motion of the particles described,- for example, in Japanese Pat. Publication No. 26105/68.

The method of the present invention is also characterized by the fact that substantially all of the contacting system (liquid, gas, particulate solid) ascending through the contact zone overflows from the top of such zone and the particulate drops gravitationally through the precipitation zone to be re-cycled into the lower portion of the contact zone and no flow of fluid is substantially present in said precipitation zone.

By practicing the method of this invention, the following advantages can be achieved: Namely, in practicing the method of this invention the substitution, withdrawal and replenishing of the particulate solid can be accomplished without interrupting the operation. The replenishing and withdrawal of the particulate solid can be effected from the contact zone or precipitation zone.

In the method of this invention, on the other hand, the cross-sectional area of the precipitation zone is larger than that of the contact zone. Therefore, the linear velocity of the fluid decreases sharply as the fluid enters the overlow zone from the contact zone and the particulate solid which has been in the fluidized state in the contact zone, overflows into the precipitation zone from the controlled level in the overflow zone. In the precipitation zone, there is no substantial flow of fluid and the particulate solid falls in the precipitation zone under gravity. This not only makes the separation of particulate solid and fluid very easy but also enables the upper level of the contact zone to be controlled constant. Therefore, the method of this invention can be operated, not only with the particulate solids hitherto used in the conventional dense-phase fluidized beds but also with particulate solids of even smaller particle sizes. It is also to be noted that in the method of this invention the particulate solid can be separated without providing any additional means in the reaction vessel.

In applying the subject contacting method, for example, to a hydrogenation treatment of hydrocarbons, a catalyst is used as the particulate solid. This catalyst is normally produced using an extrusion-molded carrier or spherical carrier and accordingly it is substantially impossible to make the shapes of the individual catalyst particles uniform. In practice, the particle size and length of the catalyst vary in a wide range, and to narrow the range is of economical disadvantage as it will add to the cost of catalyst. According to the present invention, a catalyst of widely varying particle size or length can be used relatively easily, and further the operation is smooth and stable even when such catalyst is used.

The method of this invention does not involve the errosion or errosion-corrosion problem as it does not utilize vigorous circulation of slurry, and accordingly can suitably be used for the hydrogenation treatment under high temperature and pressure, for example, of sulfur-, nitrogen- or other complicated inorganic or organic compound-containing heavy oils, which will form corrosive substances. Furthermore, the use of the double-walled reactor in the method of the present invention is effective in substantially alleviating the problem of errosion or errosion-corrosion of the inside surface of the reactor, as will be described later, which has been encountered in practicing the conventional processes.

In the conventional fluidized bed processes, the quantity of fluid to be introduced in a catalytic reaction vessel is restricted to an extremely narrow range, depending upon the quantity and type of particulate solid used. According to the present invention, however, the quantity of fluid to be introduced into the catalytic reaction vessel can be varied in a wide range since the contact is effected by making use of the overflowing behavior of the particulate solid. This is advantageous not only in that, in the catalytic reaction of hydrocarbons, for example, the process can be operated under optimum conditions with respect to the properties of the material oil and the quality and type of the desired product, by relatively freely varying the quantities of liquid and gas to be introduced into the reaction vessel; but also in that a smooth and satisfactory reaction can be ensured even on occurrence of a casual change in the reaction conditions, which is particularly desired in a catalytic reaction wherein the operational conditions are required to be varied in a wide range.

In general, the degree of reverse mixture is greater in the ordinary fluidized bed process than in the fixed bed process and, under the same conditions, the reactivity is lower and a larger quantity of by-product is formed in the case of the former process than in the case of the latter process when the reaction velocity is relatively low. In the method of this invention, however, since a liquid and a particulate solid or a liquid, a gas and a particulate solid move upwardly in the contact zone wherein the contact of these elements substantially takes place, the flow of the contact system is close to a piston flow and a higher reactivity can be obtained than in the case of the oridinary fluidized bed process.

Further, in the method of this invention, the particulate solid moves upwardly while making a substantial motion, so that non-uniform temperature and a substantial pressure drop of the bed will not occur as has in the fixed-bed process.

The present invention will be described more specifically with reference to the accompanying drawings, which show embodiments of the invention and in which.

Figure 1:
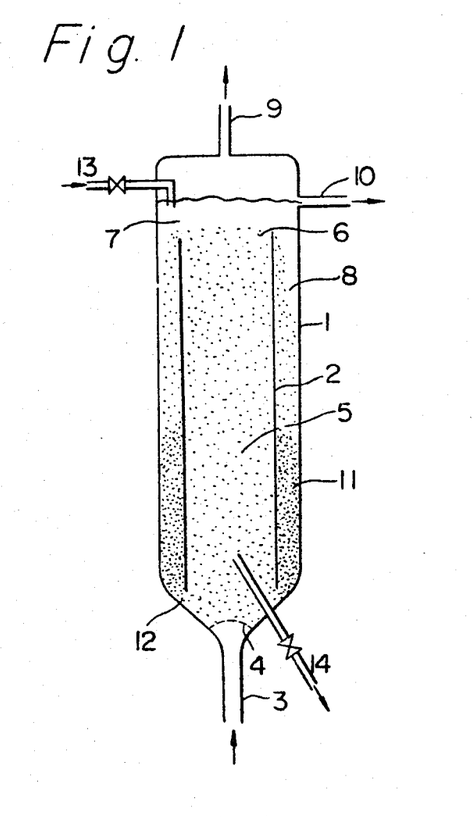
FIGS. 1 – 4 are diagrammatical views illustrating various types of the apparatus used for practicing the method of the present invention respectively.

Referring first to FIG. 1, a contact vessel of double-walled structure is shown. As shown, the contact vessel comprises a cylindrical outer tube 1 and a cylindrical inner tube 2 disposed in outer tube 1. A particulate solid is first charged in the reaction vessel and then a liquid or a liquid and a gas are introduced through a conduit 3 into the vessel at a portion below the inner tube 2, preferably through a distributor 4. Here, it is essential that the specific gravity of the particulate solid is greater than that of the liquid and is preferably at least 1.05 times that of the latter. The mass of particulate solid charged in the vessel is expanded by the fluid (the liquid and the gas), introduced from the lower portion of the vessel, relative to the volume of the same in the stationary state and the individual particles are in continuous motion and simultaneously move upwardly. Such phenomenon takes place within the inner tube 5 (contact zone) and contact of the liquid and the particulate solid or the liquid, the gas and the particulate solid is effected in such zone.

For realizing such condition of the particulate solid, it is only sufficient to introduce the liquid or the liquid-gas mixture into the contact zone, preferably through the distributor 4, at a certain rate, e.g. at such rate as will achieve a velocity of 0.3 – 50 cm/sec within such zone, as determined by the properties and quantity of the particulate solid and the structures of the lower portions of the inner and outer tubes, as will be fully described later.

The liquid and the particulate solid or the liquid, the gas and the particulate solid ascending through the contact zone 5, overflow from the top end of the inner tube 6 into a space 7 (overflow zone) thereabove. The overflowing particulate solid immediately falls under gravity through the annular space 8 between the outer tube 1 and the inner tube 2. On the other hand, the overflowing gas and overflowing liquid are discharged to the outside of the system through conduits 9 and 10 respectively. The gas and the liquid may be withdrawn from the vessel through the same nozzle.

The particulate solid gravitationally dropping through the annular space 8 (precipitation zone) is settled in the lower portion of the precipitation zone and forms a closely accumulated layer at a portion 11. The term "thickly accumulated layer" as used herein refers to a condition similar to that wherein a layer of settled particulate solid in a stationary liquid is withdrawn from the lowermost portion thereof while continuously letting the particulate solid settle under gravity in the liquid and, therefore, the layer of the particulate solid progressively moves downwardly.

It is one of the characteristic features of the present invention that the lower portion of the precipitation zone is communicated with the lower portion of the contact zone. Namely, in FIG. 1 the lower portion of the inner tube 2 is communicated with the lower portion of the annular space 8 between the inner tube 2 and the outer tube 1, through a gap 12.

The solid particle settling in the lower portion of the precipitation zone gradually continuously moves into the lower portion of the inner tube 2 through the gap 12. In the stable condition of the operation, the quantity of the particulate solid overflowing from the overflow zone 7 and precipitating through the precipitation zone 8, is equal to the quantity of particulate solid moving into the contact zone through the gap 12, and thus the normal condition is maintained.

Under such condition, no substantial flow exists in the precipitation zone, compared with that in the contact zone. The liquid or the liquid and the gas introduced from the lower portion of the reaction vessel pass through the contact zone, without passing through the precipitation zone. Therefore, it is unnecessary to lead the liquid or the liquid and the gas into the contact zone, but the method shown in FIG. 1 and ones which will be described later with reference to FIGS. 2 and 3, will be sufficient.

In the present invention, the particulate solid can be replenished or withdrawn while continuing the contacting operation without interrupting it. Further, the particulate solid can be replenished at any location but preferably at the overflow zone. In the construction shown in FIG. 1, the particulate solid is replenished through a conduit 13 into the overflow zone 7, either as such or in the form of dispersion in the liquid. The particulate solid may be withdrawn from the system at the contact zone or the precipitation zone. In the construction shown in FIG. 1, the particulate solid is withdrawn from the contact zone through a conduit 14.

In general, it is in most cases difficult to uniformalize the shape of the individual solid particles which are to be used in a process wherein they are contacted with liquid or with liquid and gas in a fluidized state. For instance, when the particulate solid is a catalyst, the diameter and length of the solid particle vary in a wide range, no matter whether the particles are an extrusion-molded catalyst or spherical catalyst and such is advantageous in most cases. Further, when a particulate solid is in a fluid which has a velocity higher than the terminal velocity of the particles, it is usual that the particles are carried away while being entrained in the fluid. In the conventional dense-phase fluidized bed process, if the size and specific gravity of the particulate solid used is not uniform, a phenomenon will occur in which the relatively small particles are carried away by the fluid which is introduced at a velocity sufficient to cause the relatively large particles to be fluidized. On the other hand, where use was made of a relatively small particulate solid, the separation of the fluid and the particulate solid has been difficult even before the velocity of the fluid reached the terminal velocity of the particles. Therefore, in the conventional fluidizing methods it has been difficult to use a mass of such particulate solid which varies widely in shape and physical properties, and to separate the fluid and the particulate solid within the reaction vessel. The method of the present invention has made it possible to use a particulate solid whose size and physical properties vary widely, by making the separation of particulate solid easy.

In the conventional dilute-phase fluidized bed processes, on the other hand, it has been necessary to separate the particulate solid used, exterior of the reaction vessel and to transport the separated particulate solid. Such operations are undesirable both technically and economically. Further, in the conventional dense-phase fluidized bed processes, as seen in Japanese Pat. Publication No. 26105/68, the velocity of a liquid or of a liquid and a gas introduced into the reaction vessel is restricted within a considerably narrow range, so as to achieve the fluidization of the particulate solid while preventing the particulate solid from moving out of the reaction vessel. In the method of the instant invention, it is possible, by suitably selecting the diameter $d$ of the contact zone 5 and the diameter $D$ of the overflow zone 7, to vary the velocity of the liquid or of the liquid and the gas in a wider range than that in the conventional processes and yet to fluidize the particulate solid and separate the same within the reaction vessel.

As stated previously, the reaction vessel of double-walled structure as shown in FIG. 1 is used for practicing the method of this invention. The use of the double-walled structure solves the problem of errosion or errosion-corrosion of the inner surface of the reaction vessel, possessed by the conventional processes. Namely, in practicing the conventional processes by fluidizing a particulate solid, the inner wall of the reaction vessel used is brought into contact with the fluidized particulate solid. Therefore, errosion of the inner surface of the reaction vessel must be taken into consideration. Furthermore, where a corrosive substance is present in the reaction vessel, errosion-corrosion must be taken into consideration in addition to errosion, in selecting the material of the inside wall of the reaction vessel. Still further, the resistance to pressure of the reaction vessel must be considered wherever the operation is carried out under high pressures. According to the present invention, however, the inside surface of the inner tube is the only place which calls for consideration with respect to errosion and errosion-corrosion. Further, the inner tube is so simple in construction that it is not required to be resistive to pressure even under high pressure and can very easily be replaced. It is not necessary at all to consider the errosion and errosion-corrosion of the inside surface of the outer tube.

In the conventional reaction vessels, it has been necessary to provide various means within the reaction vessel or to provide a considerably large space above the reaction zone, for effecting separation of the particulate solid. In the method of the instant invention, the particulate solid overflowing from the contact zone falls down from the top end of the inner tube along the outer surface of the same, without moving further upwardly, so that the space necessary for the separation of particulate solid can be considerably small relative to the volume of the reaction vessel.

Figure 2:
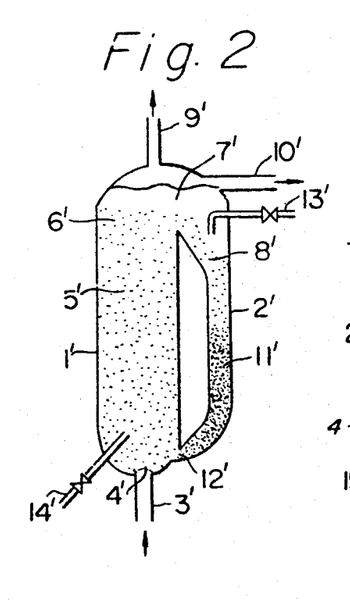
Figure 3:
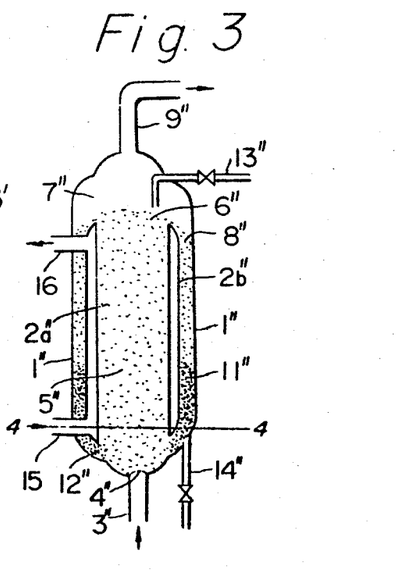

Referring now to FIGS. 2 and 3, contact vessels are shown which have different constructions from that of FIG. 1 respectively. In the construction shown in FIG. 2, the contact vessel does not have an inner tube as does the contact vessel of FIG. 1 and instead a pipe 2' is provided to define the precipitation zone for particulate solid. A cylindrical tube 1' is the main body of the contact vessel and the pipe 2' is branched from the top end of the tube 1' as shown. In operation, a particulate solid is charged in the tube 1' and/or the pipe 2' and then a liquid or a liquid and a gas are introduced into the tube 1' from a conduit 3', preferably through a distributor 4'. The particles are in continuous motion as in FIG. 1 and also move upward. Contact is substantially effected in the interior 5' (contact zone) of the tube 1'. The liquid and the particulate solid or the liquid, the gas and the particulate solid ascending through the contact zone 5' overflow from the upper portion 6' of the tube 1' into a space 7' (overflow zone) thereabove. The overflowing particulate solid immediately falls down under gravity through the interior 8' (precipitation zone) of the pipe 2'. On the other hand, the overflowing gas and liquid are discharged to the outside of the system through conduits 9' and 10' respectively.

The particulate solid falling gravitationally through the precipitation zone 8' is settled in the lower portion of the precipitation zone, forming a thickly accumulated layer at 11'. The lower end of the pipe 2' is communicated with the lower portion of the tube 1' through a gap 12', so that the particulate solid moves continuously into the lower portion of the tube 1' through gap 12'. In the stable condition of the operation, the quantity of the particulate solid overflowing from the overflow zone 7' into the precipitation zone 8' is equal to the quantity of the same moving into the contact zone through the gap 12', and thus the normal condition of operation is maintained. The particulate solid is replenished through a conduit 13' and withdrawn through a conduit 14'. The vessel shown in FIG. 2 is advantageously used for a contacting operation accompanied by generation or absorption of heat, because heat can easily be supplied or absorbed exteriorly of the tube 1' and/or the pipe 2'. Although the vessel shown in FIG. 2 has only one precipitation pipe 2', it may have two or more similar pipes.

Figure 4:
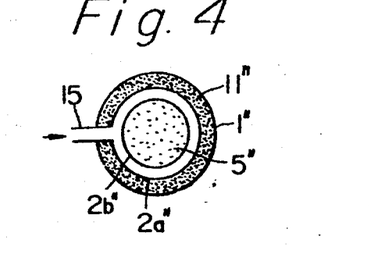

FIG. 3 shows another type of contact vessel which has a triple-walled structure to define an annular space for introducing mainly a heating medium therein. FIG. 4 is a cross-section taken along the line 4—4 of FIG. 3.

In FIGS. 3 and 4, reference numeral 1'' designates an outer tube of the reaction vessel, and 2a'' and 2b'' designate inner tubes of the same. The inner tubes 2a'' and 2b'' define an annular space therebetween which does not communicate with the interior of the contact system. A suitable heating medium is passed through the annular space so as to maintain a desired contact temperature. In operation, a particulate solid is charged in the vessel and a fluid (liquid, gas) is introduced from a conduit 3'' through a distributor 4''. The particulate solid is in continuous motion and also moves upward through the space 5' in the inner tube. Substantial contact is effected in the space 5'' (contact zone). The liquid and the particulate solid or the liquid, the gas and the particulate solid ascending through the space 5'' overflow from the top end 6'' of the space 5'' into a space 7'' (overflow zone) thereabove. The overflowing particulate solid immediately falls through an annular space 8'' (precipitation zone) under gravity. On the other hand, the overflowing liquid and gas are discharged to the outside of the system through a conduit 9''.

The particulate solid gravitationally falling through the precipitation zone 8'' settles in the lower portion of such zone and forms a thickly accumulated layer at 11''.

The lower portion of the precipitation zone is communicate with the lower portion of the contact zone 5'' through a gap 12'', so that the particulate solid continuously moves into the lower portion of the contact zone 5'' through gap 12''. A conduit 13'' is provided for replenishing the particulate solid and a conduit 14'' for withdrawing the same.

A heating medium is introduced from a conduit 15 into the annular space between the walls 2a'' and 2b'', and discharged from a conduit 16, whereby the contact zone is maintained in a desired temperature condition.

The contacting method of the present invention is effectively used for such physical treatments as absorption, drying, adsorption, desorption and washing. The particulate solid usable in the present invention includes diatomaceous earth, bauxite, natural or synthetic zeolite, powdered ores of various metals, silica gel, alumina gel, various pigments, beaded glass, borax and minerals. The usable liquids include various types of solvents, such as aqueous solutions of various compounds, hydrocarbons, alcohols, ketones, etc. The usable gases include air, nitrogen, lower hydrocarbons, hydrogen, ammonium, aqueous vapor, carbon monoxide, hydrogen sulfide, sulfurous acid gas and gaseous compounds. These particulate solids, liquids and gases are selectively used according to the object desired to be attained.

The contacting method of this invention may also be used for such various chemical treatments as oxidation, reduction, hydration, cracking, etc. In these cases, the particulate solid is normally used as a catalyst, with the surface thereof being used as a contacting surface, but is also effectively used in the cases wherein the particulate solid performs these reactions per se. The method of this invention is particularly advantageously used in the conversion of hydrocarbons, such as isomerization, dehydration, polymerization, reforming, alkylation, hydrogenolysis, hydrogen addition, hydrogenation desulfurization, etc.

In these cases the particulate solid is used as a catalyst, and usually an alumina type, silica-alumina type or other crystalline or noncrystalline porous substance is used as such as a catalyst per. se. or as a carrier with a selected active metal attached thereto.

The properties and shape of the particulate solid usable in the present invention are variable in a very wide range. The specific gravity of the particulate solid must be greater than that of the liquid used and preferably is at least 1.05 times that of the liquid. The shape of the particulate solid may be spherical, cylindrical or any other shape. The mean particle size of the particulate is solid is in the range of 0.1 mm – 10 mm. It is particularly advantageous to use a particulate solid whose mean particle size falls within the range of 0.3 mm – 2 mm. In the contacting method of this invention, the separation of particulate solid and liquid is easy because the particulate solid is allowed to overflow. Therefore, it is possible to use particulate solids of such small sizes, the separation of which from liquid was considerably difficult or complicated in the conventional methods. In a liquid-particulate particulate solid or liquid-gas-particulate solid contacting method, it is generally preferred to use a particulate solid whose surface area per unit weight is large, so as to attain intimate contact. The present invention allows this and is of great industrial value.

For practicing the method of this invention effectively, the velocity of a liquid or a liquid and a gas introduced into the contact vessel and ascending through the contact zone is usually 0.1 – 100 cm/sec, preferably 0.3 – 50 cm/sec.

The velocity may be varied during continuous operation of the method, though within a limited range as determined by the specific gravity, the quantity and the mean particle size of the particulate solid used, the specific gravity and the viscosity of the liquid, and the shape of the vessel, particularly by the size of the gap 12 (12', 12") communicating the precipitation zone and the contact zone with each other.

It is also possible, in practicing the present invention, to vary the temperature and pressure in a wide range, and to use two or more reaction vessels by connecting them in parallel or in series.

In order for the desired condition to be realized in practicing the method of this invention, the shape and the physical properties of the particulate solid, the physical properties and the velocity of liquid and the shape of the reaction vessel are the influential factors. These factors are interrelated with each other and cannot generically be defined, but the interrelation will be apparent from the following description with reference to the type of reaction vessel shown in FIG. 1.

Figure 5:
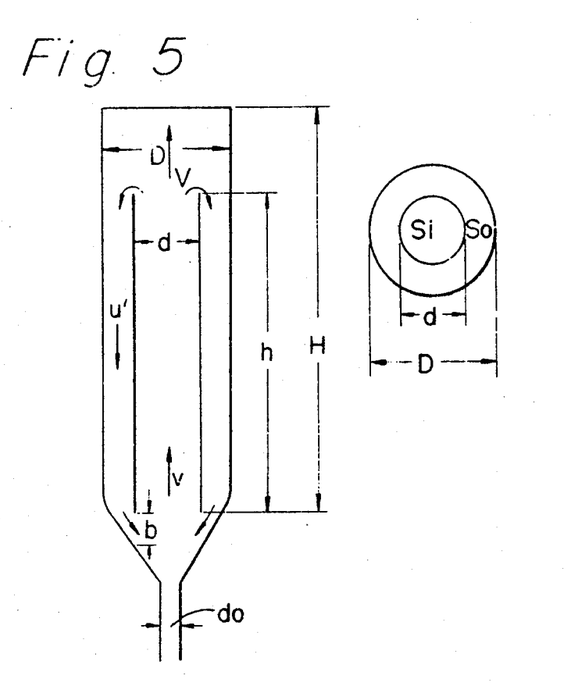
FIG. 5 is a schematic view showing the dimensions of various portions of the apparatus used in the method of this invention.

Referring to FIG. 5, when the linear velocity of the fluid within the interior (contact zone) of the inner tube is $v$ (cm/sec) and in order to fluidize the particulate solid in the contact zone, the velocity $v$ must be greater than the flow starting velocity $v_{mf}$ (cm/sec) which is determined by the physical properties of the fluid and the shape and physical properties of the particulate solid.

$$v > v_{mf} \tag{1}$$

The particulate solid is fluidized and the solid particle bed is expanded when the relation (1) is satisfied. The expansion coefficient is defined as follows:

$$\eta = Lf/Lo$$

wherein $Lo$ is the height of the particulate solid bed in the stationary state and $Lf$ is the height of the particulate solid bed in the fluidized state. In the case of the type of reaction vessel shown, the expansion coefficient is a function of the linear velocity $v$ of the fluid in the inner tube and concurrently is variable depending upon the physical properties and shape of the particles; the construction (the inner tube diameter to the inner diameter of the reaction vessel $D/d$, the height of the inner tube, the gradient of the tapered lower portion of the vessel, the space interval between the lower end of the inner tube and the tapered lower portion of the vessel, etc.) and surface smoothness of the reaction vessel; and the physical properties of the liquid. Where the fluid consists of a mixture of liquid and gas, the liquid is the one which has substantial influence on the flow of the particulate solid. Therefore, the linear velocity of the liquid can be regarded as the linear velocity of the fluid.

Figure 6:
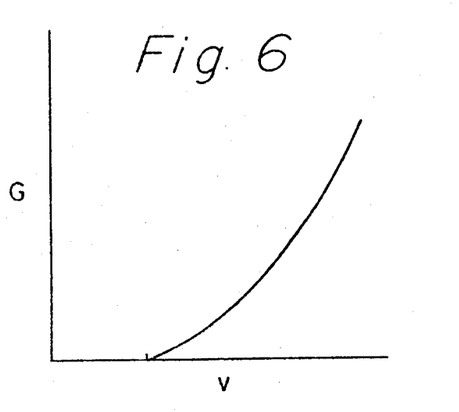
FIG. 6 is a diagram showing the relationship between the quantity of circulating particulate solid and the velocity of fluid.

In the type of vessel being discussed, the particulate solid is circulated from the inner tube (contact zone) through the outer tube (precipitation zone) back to the inner tube. The quantity of the circulating particulate solid, similar to the expansion coefficient described above, is variable depending upon the physical properties and shape of the particulate solid, the construction of the reaction vessel (the value of $D/d$ and the dimensions of $d, h, \theta, b$ and $do$ in FIG. 5), the smoothness of the inner surface of the reaction vessel, etc. In general, however, the circulating quantity G increases with the linear velocity $v$ as shown in FIG. 6. Namely, with the other factors being fixed, the circulating quantity is represented by $$G = f(V) \text{ (cm}^3\text{/sec)} \tag{2}$$

Therefore, the moving velocity $u'$ of the particles within the annular space between the inner tube and the outer tube (precipitation zone) is represented by the following formula:

$$u' = G/So \text{ (cm/sec)} \tag{3}$$

wherein So is the cross-sectional area (cm²) of the annular space.

On the other hand, the velocity $\bar{u}$ (cm/sec) of the particulate solid falling through the liquid under gravity, is determined by the physical properties of the liquid and the shape and physical properties of the particulate solid, and is usually determined from the Stokes' formula.

If $u'$ is greater than $\bar{u}$, the particulate solid in the outer tube will not form a stationary layer but will move downward through the tube, whereas if $u'$ is smaller than $\bar{u}$, the particulate solid will form a stationary layer and move downward in that state. Assuming that the liquid velocity is constant, that is, the expansion coefficient of the particle bed in the inner tube is constant, the circulating quantity of particulate solid is governed by the sum of the resistance of the particulate solid within the annular space between the inner tube and the outer tube and the resistance to the particulate solid moving from the annular space into the inner tube. Thus, it will be understood that the width and the cross-sectional area of the annular space and the shape of the lower portion (mainly the taper) of the outer tube and the gap b between the lower end of the inner tube and the tapered lower portion of the outer tube are important factors. However, whether a substantial circulating flow of the liquid occurs in the annular space of the reaction vessel in a downward direction or not is also related to the resistance to the fluid withdrawn from the reaction vessel. Namely, by making the resistances of the outlet nozzle and the conduit sufficiently small, the occurrence of a circulating flow of liquid can be prevented regardless of the condition of the particulate solid within the outer tube. The experiment conducted by the present inventors has revealed that the circulation resistance to liquid becomes large and a substantial circulating flow of liquid does not occur when a stationary particle layer is formed in the outer tube.

The most important characteristic of the method according to the present invention is that the particulate solid is separated from fluid within the reaction vessel. When the linear velocity of the liquid within the inner tube is $v$, the linear velocity V of the liquid after passage through the inner tube is $$V = v\,[(d/D)]^2 \tag{3}$$

Therefore, the linear velocity v of the liquid within the inner tube may be lower or higher than the terminal velocity $v_{te}$ of the particles, but the velocity V of the liquid at D of the reaction vessel is preferably not higher than the flow starting velocity of the particles.

$$V = v\,[(d/D)]^2 < v_{mf} \tag{4}$$

Namely, in the method of the present invention the liquid velocity after passage through the inner tube only need be considered with regard to the separation of the particulate solid, and the separation of catalyst is facilitated by making the value of D larger than the value of d.

Now, let us consider the condition of the particles as v is changed.

1. In the case of $v < v_{mf}$, the particulate solid is held stationary and does not move continuously. The height of the particulate solid bed in this case is represented by $\bar{h}$.

2. In the case of $v_{te} \geq v \geq v_{mf}$ and $\eta \leq h/\bar{h}$, the particulate solid moves but the upper level of the particle bed is located within the inner tube, with no particulate solid overflowing, and accordingly no circulation of particles occurs (namely, the condition of the particulate solid continuously moving upward does not exist). The condition, in this case, of the particles within the inner tube is similar to that described in Japanese Pat. Publication No. 26015/68.

3. In the case of $v_{te} > v \geq v_{mf}$ and $\eta > h/\bar{h}$, the particulate solid moves and the upper level of the particle bed is not located within the inner tube. Accordingly, the upper level of the particle bed is at the upper end of the inner tube, irrespective of v. A quantity of particles equal to the quantity of overflowing particles falls in the outer tube and moves into the inner tube.

4. In the case of $v \geq v_{te}$ and $V < v_{mf}$, the particulate solid within the inner tube is carried away by being entrained in the flow of liquid but is separated from the liquid after passage through the inner tube and falls into the outer tube. In the case of 3) and 4) above, when the quantity of the circulating particulate solid is a. $u' \leq \bar{u}$, a stationary particle layer is formed in the outer tube and the particles moves downward in that condition, and when b. $u' > \bar{u}$, a stationary layer of particles is not formed in the outer tube.

5. In the case of $v > v_{te}$ and $v_{te} > V \geq v_{mf}$, the particulate solid within the inner tube is entrained in the liquid and the upper level of the particulate solid bed, as determined by V, is located higher than the top end of the inner tube. When this top end is located within the reaction vessel, i.e., when $$\eta \leq H/\bar{h} \tag{5}$$

the upper level of the particle bed is located within the reaction vessel but is not so distinct as in the case of 4) or 5) above, and the particles are not completely separated. On the other hand, when $$\eta > H/\bar{h} \tag{6}$$

the upper level of the particle bed is not present within the reaction vessel. In this case, the separation of particulate solid within the reaction vessel is difficult and other methods must be considered for separating the particulate solid, as in German Pat. specification No. 843,842.

6. In the case of $V \geq v_{te}$, the particles within the inner tube are carried out of the reaction vessel by being entrained in the fluid. In this case, other methods must be considered for separating the particulate solid within the reaction vessel, similar to the preceding case.

In the method of the present invention, the operation is carried out under the conditions of 3) and 4) a). Under such conditions, the particulate solid is in continuous motion and also moves upward through the interior (contact zone) of the inner tube. Then, the particulate solid overflows the controlled level of the top end (overflow zone) of the inner tube into the outer tube (precipitation zone) and falls therethrough under gravity to form a thickly accumulated layer of stationary particulate solid. The solid particle moves gradually downwardly in that state and is recycled into the lower portion of the inner tube under gravity.

One of the processes in which the method of this invention exhibits the most remarkable advantage over the prior art methods, is a hydrogenation desulfurization treatment of petroleum residuum-rich heavy oils. A particularly remarkable advantage can be obtained when the method of this invention is employed in the hydrogenation desulfurization treatment of sulfur-containing hydrocarbon oils containing a substantial quantity of petroleum-type distillation residual oils (hereinafter referred to as petroleum residuum-rich heavy oils), which are generally called heavy oil. In general, the hydrogenation desulfurization of such petroleum residuum-rich heavy oils is effected by contacting the heavy oil and hydrogen with each other under high temperature and high pressure, in the presence of a suitable catalyst. Namely, the reaction is carried out at a temperature of 250° – 600° C. and at a pressure of 50 – 350 kg/cm².g. The suitable catalyst referred to here is, for example, a sulfur-resistant catalyst, such as nickel-molybdenum catalyst, nickel-cobalt-molybdenum catalyst, cobalt-molybdenum catalyst, nickel-tungsten catalyst or nickel-cobalt-tungsten catalyst, comprising alumina or silica gel as carrier. The shape of the catalyst is optional and a spherical catalyst, an extrusion-molded catalyst, pellet catalyst or any other shape of catalyst which has heretofore been used in the hydrogenation treatment of such petroleum residuum-rich heavy oils may be used.

The size of a catalyst particles which can be used in the method of this invention, can vary in an extremely wide range. In general, however, a catalyst of a particle diameter of 0.1 – 10 mm is preferably used. In the hydrogenation treatment of petroleum residuum-rich heavy oils, it is usual to charge the material oil at a liquid space velocity on the order of 0.2 – 2.0 (hr⁻¹) with respect to the quantity of catalyst (VOL) in the reaction vessel. In the method of the present invention, the oil is normally charged at a liquid space velocity of 0.5 − 5.0 ($hr^{-1}$) with respect to the volume of the contact zone. The charging rate of hydrogen is preferably within the range of 50 − 300 H2-NTP/FEED OIL (VOL) relative to the charging rate of the oil. Generally, in this type of operation, it is usual to recycle the unreacted hydrogen gas, exhausted from the reaction vessel, for reuse, and such practice is also preferable in practicing the method of this invention. When a catalyst is used in a fluidized state, the linear velocity of a liquid necessary to fluidize the catalyst is generally variable depending upon the physical properties and shape of the catalyst particle. In the method of this invention, the concentration of the catalyst bed within the contact zone is preferably in the range of 1/1.05 − 1/3.0 with respect to the concentration of the catalyst in a stationary state. Such condition is generally obtained by circulating the petroleum residuum-rich heavy oil, but such circulation of the oil is not always necessary where the catalyst particles are relatively small in size. The quantity of circulating gas is variable depending upon the quantity of the circulating heavy oil but preferably within the following range: Namely, $$10 \leq \frac{\text{Quantity of hydrogen introduced into the reaction vessel (NTP·VOL)}}{\text{Quantity of heavy oil introduced into the reaction vessel (VOL)}} \leq 200$$

Now, the present invention will be further illustrated by way of examples:

EXAMPLE 1

Using a reaction vessel of the type shown in FIG. 1, a hydrodesulfurization reaction was carried out. The properties of the oil and the catalyst used, the reaction conditions and the dimensions of the reaction vessels are shown in Table 1, and the properties of the product obtained are also shown in Table 1. The catalyst was replaced every 24 hours. The used catalyst was withdrawn from the contact zone. During the operation, the condition of the catalyst in the reaction vessel was observed by means of a γ-ray level meter and the formation of a layer of stationary catalyst in the precipitation zone was confirmed. The quantity of the catalyst particles carried out of the reaction vessel, during the operation, by being entrained in the fluid was about 0.5 percent of the quantity initially charged in the reaction vessel. This signifies that the catalyst particles are separated from the fluid in the reaction vessel highly efficiently, in spite of the fact that they are small in size. The light oil was completely free of olefin components and an analysis revealed that the outlet gas was also free of olefin components. This shows that thermal cracking did not substantially occur during the reaction. The temperature of the contact zone was measured at five points and the maximum temperature difference was 3° C. This shows that the catalyst particles were fluidized satisfactorily and the heat of reaction was substantially completely removed, with no local concentration of heat. The hydrogen consumption was 130l-NTP/l-FEED OIL which is substantially less than the consumption commonly known in the art. This indicates that the quantity of hydrogen used for the cracking, etc. of the oil is small or, in other words, the degree of conversion into light oil is small as substantiated by the lower viscosity of the product. This is probably because, since the desulfurization reaction proceeds so effectively that cracking reaction, etc. is suppressed, though the reaction temperature is relatively low.

The apparatus showed no indication of errosion, corrosion or errosion-corrosion upon completion of the operation, and no wear or deformation of the catalyst was observed.

TABLE 1

| Item | Material oil | Product |
|---|---|---|
| Properties of oil: | | |
| Type of material oil | (1) | |
| Total sulfur (wt. percent) | 4.05 | 0.85 |
| Desulfurization ratio (percent) | | 79.0 |
| Remaining carbon (wt. percent) | 11.87 | 6.23 |
| Yield based on material oil (wt. percent) | | 98.1 |
| Viscosity (cst @ 50° C.) | 1022 | 323.4 |
| Catalyst: | | |
| Type of catalyst | Co-Mo catalyst comprising silica-alumina as carrier. | |
| Shape of particle | Spherical shape of 0.2-0.8 mm. in diameter. | |
| True specific gravity | 3.51 | |
| Reaction conditions: | | |
| Reaction temperature (° C.) | 380 | |
| Pressure (kg./cm.²·g.) | 200 | |
| LSV (vol./vol./hr.) | 1.1 | |
| Continuous operation time (hr.) | 670 | |
| Linear velocity of oil in the reaction vessel (cm./sec.) | 2.7 | |
| Linear velocity of gas in the reaction vessel (cm./sec.) | 1.5 | |
| Hydrogen charging rate | 180 (m³-NTP)/Feed Oil (m³) | |
| Catalyst replacing rate | 0.1 wt. percent/hr. | |
| Catalyst falling velocity in the precipitation zone | 3.8 cm./sec. | |
| Dimensions of reaction vessel: | | |
| Height of reaction vessel | 2 m. | |
| Inner diameter of inner tube | 8 cm. | |
| Height of inner tube | 1.5 m. | |
| Clearance of precipitation | 1 cm. | |

[1] Normal pressure residuum.

EXAMPLE 2

Using a reaction vessel of the type shown in FIG. 1, hydrocracking of a normal pressure residuum was conducted. The properties of the material oil and the catalyst used, the reaction conditions and the dimensions of the reaction vessel are shown in Table 2, and the properties of the product are also shown in Table 2. The catalyst was charged and withdrawn at every 12 hours. The used catalyst was withdrawn from the precipitation zone. During the operation, the formation of a layer of stationary catalyst was confirmed in the precipitation zone by means of a γ-ray level meter. The temperature in the contact zone was measured throughout the period of operation and the maximum temperature gradient was 2° C. This shows that the heat of reaction is effectively removed by the flowing catalyst particles. No catalyst particles were carried out of the system by being entrained in the fluid and no wear of the catalyst particles was observed at all, during operation. The product was washed and the washing was filtered, but a fine powder of catalyst was not seen on the filter which would otherwise be produced by the wear, etc. of the catalyst particles. From the LHSV, the reaction temperature and the yield of the light oil, it will be seen that the contact within the reaction vessel is excellent.

TABLE 2

| Item | Material oil | Product |
|---|---|---|
| Properties of oil: | | |
| Type of material oil | (1) | |
| Pour point (° C.) | +45 | +31 |
| Specific gravity (15/4° C.) | 0.8897 | 0.841 |
| Viscosity (cst) | 15.4 @ 98.9° C. | 10.1 @ 50° C. |
| Remaining carbon (wt. percent) | 3.8 | 2.7 |
| Yield of light oil (distillates below 300° C.) based on material oil | | 78.1 |
| Catalyst: | | |
| Type of catalyst | | Extrusion-molded Ni-W catalyst comprising silica-alumina as carrier and having a diameter of 0.7 mm. |
| Shape of particle | | |
| Apparent specific gravity | | |
| Reaction conditions: | | |
| Reaction temperature (° C.) | | 400 |
| Reaction pressure (kg./cm.²·g.) | | 100 |
| LSV (vol./vol./hr.) | | 0.9 |
| Continuous operation time (hr.) | | 415 |
| Linear velocity of oil in contact zone (cm./sec.) | | 8.1 |
| Linear velocity of gas in contact zone (cm./sec.) | | 7.0 |
| Falling velocity of catalyst in precipitation zone (cm./sec.) | | 10.7 |
| Hydrogen charging rate | | 350 (m³-NTP)/Feed Oil (m³) |
| Catalyst replacing rate | | 0.2 wt. percent/hr. |
| Dimensions of reaction vessel: | | |
| Height of reaction vessel | | 4 m. |
| Inner diameter of inner tube | | 20 cm. |
| Height of inner tube | | 3.5 m. |
| Clearance of precipitation zone | | 2 cm. |

¹ Normal pressure residuum.

EXAMPLE 3

Using a reaction vessel of the type shown in FIG. 2, a hydrodesulfurization reaction was conducted. The properties of the material oil and the catalyst used, the reaction conditions and the dimensions of the reaction vessel are shown in Table 3, and the properties of the product obtained are also shown in Table 3. The catalyst was replaced at every 16 hours. The used catalyst was withdrawn from the contact zone.

It was confirmed by a γ-ray level meter that in this type of reaction vessel as well as that used in the preceding Examples, the catalyst moved smoothly through the precipitation zone as well as in the contact zone and the upper level of the catalyst particles in the vessel was fixed. The separation of the catalyst particles was excellent and only 0.7 percent of the catalyst initially charged was lost during operation. There was no indication of errosion, corrosion and errosion-corrosion in both the contact zone and the precipitation zone, and no deformation of the catalyst particles was observed.

TABLE 3

| Item | Material oil | Product |
|---|---|---|
| Properties of oil: | | |
| Type of material oil | (1) | |
| Total sulfur (wt. percent) | 4.11 | 0.80 |
| Desulfurization ratio (percent) | | 80.5 |
| Remaining carbon (wt. percent) | 11.91 | 6.17 |
| Yield based on material oil (wt. percent) | | 97.4 |
| Viscosity (cst @ 50° C.) | 1014 | 341.5 |
| Catalyst; | | |
| Type of catalyst | | Spherical Ni-Co-Mo catalyst comprising silica-alumina as carrier and having a diameter of 0.2–0.6 mm. |
| Shape of particle | | |
| True specific gravity | | 3.60 |
| Reaction conditions; | | |
| Reaction temperature (° C.) | | 397 |
| Reaction pressure (kg./cm.²·g.) | | 170 |
| LSV (vol./vol./hr.) | | 1.0 |
| Continuous operation time (hr.) | | 500 |
| Linear velocity of oil in reaction vessel (cm./sec.) | | 2.8 |
| Linear velocity of gas in reaction vessel (cm./sec.) | | 1.4 |
| Hydrogen charging rate | | 200 (m³-NTP)/Feed Oil (m³) |
| Catalyst replacing rate | | 0.13 percent/hr. |
| Falling velocity of catalyst in precipitation zone (cm./sec.) | | 5.1 |
| Dimensions of reaction vessel: | | |
| Height of reaction vessel | | 2 m. |
| Inner diameter of contact zone | | 10 cm. |
| Inner diamter of precipitation zone | | 4 cm. |
| Inner diameter of overflow zone | | 16 cm. |

¹ Normal pressure residuum.

EXAMPLE 4

Liquefied petroleum gas, straight-run gasoline, naphtha, kerosene, light oil and other fractions of distillate, which are obtained by the fraction of a crude oil, and fractions of distillate, such as cracked gasoline, cracked gas oil, etc., which are obtained by such fractionation methods as thermal cracking, catalytic cracking and coking, contain mercaptan compounds which are highly odorous and cause corrosion of the material of an apparatus. As a method of removing these mercaptan compounds, there has effectively been used a process which comprises extracting the mercaptan compounds with an aqueous alkaline solution, oxidizing the mercaptan compounds with an oxidizing agent, such as air, in the presence of a catalyst to thereby convert the same into disulfide compounds, and separating the disulfide compounds from the aqueous alkaline solution, the resultant aqueous alkaline solution being used repeatedly.

The reaction vessel according to the present invention was used for the oxidation of the aqueous alkaline solution mentioned above, with which the mercaptan compounds had been extracted. The dimensions of the reaction vessel used and the reaction conditions are shown in Table 4.

During the operation, the catalyst particles were not substantially worn out. Moreover, the catalyst particles were not deformed nor degraded in catalytic activity even after about 400 hours of continuous operation. Since the catalyst particles were fluidized, the dispersion of gas was excellent and a high conversion ratio could be obtained.

The reaction vessel used was of the same type as that shown in FIG. 1.

TABLE 4

| Conditions: | |
|---|---|
| Material liquid | A raffinate containing 20 p.p.m. of mercaptan sulfur, obtained by extracting a straight-run gasoline (containing 140 p.p.m. of mercaptan sulfur) with 2 N caustic soda solution. |
| Reaction temperature (° C.) | 25° C. |
| Reaction pressure (kg./cm.²·g.) | 0.5 kg./cm.²·g. |
| Catalyst | Polycobalt phthalocyanine carried on granular active carbon of 0.8 mm. in diameter. |
| Oxidizing agent | Air |
| Linear velocity of liquid (based on the superficial velocity in the column) (cm./sec.) | 0.4–2.0 |
| Linear velocity of gas (based on the superficial velocity in the column) (cm./sec.) | 0.2–1.8 |
| Mercaptan concentration in the product (p.p.m.) | 0–9 |
| Dimensions of reaction vessel: | |
| Height of reaction vessel | 2 m. |
| Inner diameter of inner tube | 8. cm. |
| Height of inner tube | 1.5 cm |
| Clearance of precipitation zone | 1.0 cm. |

What is claimed is:

1. A method of uniformly closely contacting a liquid and a particulate solid which comprises
   a. accommodating in a contact zone a particulate solid which is greater in specific gravity than said liquid,
   b. introducing said liquid into said contact zone from the lower portion thereof,
   c. causing substantially all of said particulate solid to flow continuously and also move upward through said contact zone solely by the flowing action of said liquid and in the absence of mechanical agitation, thereby substantially contacting said liquid and said particulate solid with each other, and
   d. allowing substantially all of said liquid and said particulate solid to ascend through said contact zone, overflow into an overflow zone which is provided above and larger in cross-sectional area than said contact zone,
   e. the particulate solid overflowing into said overflow zone being allowed to fall under gravity within a precipitation zone in the substantial absence of a flow of said liquid, said precipitation zone being provided exteriorly of said contact zone with the upper portion thereof in communication with said overflow zone and the lower portion in communication with the lower portion of said contact zone,
   f. said particulate solid forming a thickly accumulated layer in the lower portion of said precipitation zone and gradually moving downward in that state under gravity to be recycled into the lower portion of said contact zone, and
   g. said liquid overflowing into said overflow zone being withdrawn to the outside of the system from said overflow zone above said contact zone.

2. The method of claim 1 wherein the specific gravity of said particulate solid is at least 1.05 times that of said liquid.

3. The method of claim 1 wherein said liquid is allowed to ascend through said contact zone at a linear velocity of 0.1 – 100 cm/sec.

4. The method of claim 1 wherein said liquid is introduced and said particulate solid is circulated in such a manner that the following conditions (1) or (2) are satisfied:

$$v_{te} > v > v_{mf} \;\; \eta > h/\bar{h} \tag{1}$$

wherein $v$ is the linear velocity (cm/sec) of the liquid in the contact zone, $v_{te}$ is the terminal velocity (cm/sec) of the particulate solid and $v_{mf}$ is the flow starting velocity (cm/sec) of the particulate solid, $\eta$ is the expansion coefficient of the particulate solid layer in the contact zone, $h$ is the height of the contact zone and $\bar{h}$ is the height of the particulate solid layer in the stationary state, or wherein V is the linear velocity (cm/sec) of the liquid at the overflow zone, $u'$ is the moving velocity (cm/sec) of the particulate solid in the precipitation zone and $\bar{u}$ is the velocity (cm/sec) of the particulate solid falling through said liquid under gravity.

5. A method of uniformly closely contacting a liquid, a gas and a particulate solid which comprises
   a. accommodating in a contact zone a particulate solid which is greater in specific gravity than said liquid,
   b. introducing said liquid and gas into said contact zone from the lower portion thereof,
   c. causing substantially all of said particulate solid to flow continuously and also move upward through said contact zone solely by the flowing action of said liquid and gas and in the absence of mechanical agitation, thereby substantially contacting said liquid, gas and particulate solid with each other, and d. allowing substantially all of said liquid, gas and said particulate solid to ascend through said contact zone, overflow into an overflow zone which is provided above and larger in cross-section area than said contact zone, e. the particulate solid overflowing into said overflow zone being allowed to fall under gravity within a precipitation zone in the substantial absence of a flow of said liquid, said precipitation zone being provided exteriorly of said contact zone with the upper portion thereof in communication with said overflow zone and the lower portion in communication with the lower portion of said contact zone, f. said particulate solid forming a thickly accumulated layer in the lower portion of said precipitation zone and gradually moving downward in that state under gravity to be recycled into the lower portion of said contact zone, and g. said liquid and gas overflowing into said overflow zone being withdrawn to the outside of the system from said overflow zone above said contact zone.

6. The method of claim 5 wherein the specific gravity of said particulate solid is at least 1.05 times that of said liquid.

7. The method of claim 5 wherein the mixture of liquid and gas is allowed to ascend through said contact zone at a linear velocity of 0.1 – 100 cm/sec.

8. The method of claim 5 wherein said liquid is introduced and said particulate solid is circulated in such a manner that the following conditions (1) or (2) are satisfied:

$$v_{te} > v > v_{mf} \; \eta > h/\bar{h} \tag{1}$$

wherein $v$ is the linear velocity (cm/sec) of the liquid in the contact zone, $v_{te}$ is the terminal velocity (cm/sec) of the particulate solid and $v_{mf}$ is the flow starting velocity (cm/sec) of the particulate solid, $\eta$ is the expansion coefficient of the particulate solid layer in the contact zone, $h$ is the height of the contact zone and $\bar{h}$ is the height of the particulate solid layer in the stationary state, or $$v \geq v_{te}, \; V < v_{mf} \text{ and } u' \leq \bar{u} \tag{2}$$

$$v \geq v_{te}, \; V < v_{mf} \text{ and } u' \leq \bar{u}$$

wherein $V$ is the linear velocity (cm/sec) of the liquid at the overflow zone, $u'$ is the moving velocity (cm/sec) of the particulate solid in the precipitation zone and $\bar{u}$ is the velocity (cm/sec) of the particulate solid falling through said liquid under gravity.

* * * * *

UNITED STATES PATENT OFFICE
CERTIFICATE OF CORRECTION

Patent No. 3,754,993          Dated August 28, 1973

Inventor(s) Yutaka OGUCHI and Junichi KUBO

It is certified that error appears in the above-identified patent and that said Letters Patent are hereby corrected as shown below:

In the Claims, column 22, line 23: delete in its entirety.

Signed and sealed this 20th day of November 1973.

(SEAL)
Attest:

EDWARD M. FLETCHER, JR.　　　　　　RENE D. TEGTMEYER
Attesting Officer　　　　　　　　　　Acting Commissioner of Patents